US006966754B2

(12) United States Patent
Wobben

(10) Patent No.: US 6,966,754 B2
(45) Date of Patent: Nov. 22, 2005

(54) SYSTEM AND METHOD FOR MONITORING A WIND TURBINE

(76) Inventor: Aloys Wobben, Argestrasse 19, D-26607 Aurich (DE)

( * ) Notice: Subject to any disclaimer, the term of this patent is extended or adjusted under 35 U.S.C. 154(b) by 0 days.

(21) Appl. No.: 10/472,915

(22) PCT Filed: Feb. 14, 2002

(86) PCT No.: PCT/EP02/01572

§ 371 (c)(1),
(2), (4) Date: Mar. 15, 2004

(87) PCT Pub. No.: WO02/079646

PCT Pub. Date: Oct. 10, 2002

(65) Prior Publication Data

US 2004/0151578 A1    Aug. 5, 2004

(30) Foreign Application Priority Data

Mar. 28, 2001   (DE) .............................. 101 15 267

(51) Int. Cl.[7] .............................................. B64C 9/00
(52) U.S. Cl. .......................... 416/61; 416/43; 415/118; 415/26
(58) Field of Search ............................ 416/2–5, 36, 61, 416/197, 41, 40, 43, 44; 29/889.2–889.23; 415/118, 26

(56) References Cited

U.S. PATENT DOCUMENTS

| | | | |
|---|---|---|---|
| 4,198,866 A | | 4/1980 | Birjukov et al. |
| 4,396,843 A | | 8/1983 | Martinez |
| 4,423,634 A | | 1/1984 | Audenard et al. |
| 4,831,438 A | * | 5/1989 | Bellman et al. ............ 348/148 |
| 4,904,996 A | | 2/1990 | Fernandes |
| 5,162,659 A | | 11/1992 | Diamond et al. |
| 5,278,773 A | | 1/1994 | Cousineau |
| 5,479,818 A | | 1/1996 | Walter et al. |
| 5,523,701 A | * | 6/1996 | Smith et al. ................ 324/772 |
| 5,738,310 A | | 4/1998 | Rollet et al. |
| 5,845,230 A | | 12/1998 | Lamberson |
| 5,942,690 A | | 8/1999 | Shvetsky |
| 5,974,349 A | * | 10/1999 | Levine ........................ 701/29 |

(Continued)

FOREIGN PATENT DOCUMENTS

DE            27 51 228         4/1979

(Continued)

OTHER PUBLICATIONS

Flender ESAT, Engineering & Service für die Antriebstechnik (including English translation).

(Continued)

Primary Examiner—Edward K. Look
Assistant Examiner—Igor Kershteyn
(74) Attorney, Agent, or Firm—Neil A. Steinberg

(57) ABSTRACT

In one aspect, the present invention relates to a system for monitoring wind turbines, wherein image and acoustic monitoring, in particular, is performed. In order to further improve, for example, the maintenance, safety and efficiency of a wind turbine, it is desirable to monitor additional parameters of the wind turbine. A wind turbine is provided, wherein acoustic and optical sensors are employed to monitor the operation of the wind turbine. In one embodiment, the optical sensor images a particular location in the nacelle housing when the acoustic sensor detects a sound emanating from that location in the nacelle housing. A method for monitoring a wind turbine is described wherein when a deviation between the operating acoustic spectrum and the reference acoustic spectrum exceeds the threshold, the component that generated the operating acoustic spectrum is imaged.

30 Claims, 2 Drawing Sheets

U.S. PATENT DOCUMENTS

Figure 1:
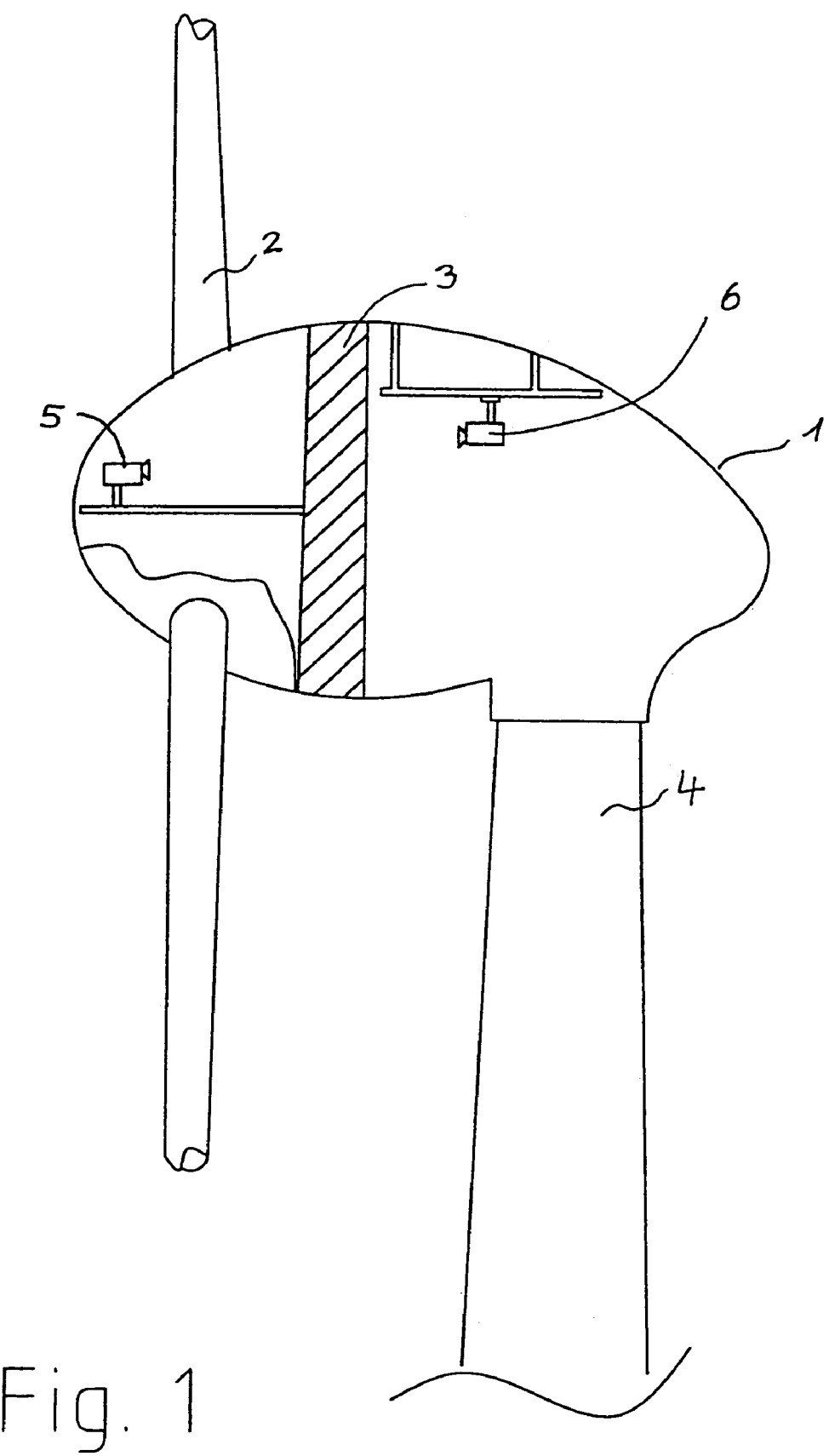

| | | | |
|---|---|---|---|
| 5,987,474 A * | 11/1999 | Sandifer | 707/104.1 |
| 5,993,194 A * | 11/1999 | Lemelson et al. | 431/14 |
| 6,014,896 A | 1/2000 | Schoess | |
| 6,076,405 A | 6/2000 | Schoess | |
| 6,076,776 A | 6/2000 | Breitbach et al. | |
| 6,173,074 B1 * | 1/2001 | Russo | 382/190 |
| 6,231,306 B1 | 5/2001 | Khalid | |
| 6,278,197 B1 | 8/2001 | Appa | |
| 6,385,558 B1 * | 5/2002 | Schlemm | 702/182 |
| 6,398,502 B1 | 6/2002 | Wobben | |
| 6,487,909 B2 * | 12/2002 | Harrold et al. | 73/593 |
| 6,499,002 B1 * | 12/2002 | Lancaster | 702/191 |
| 6,525,518 B1 | 2/2003 | Garnaes | |
| 6,647,328 B2 * | 11/2003 | Walker | 701/36 |
| 6,785,637 B1 | 8/2004 | Wobben | |
| 2002/0047275 A1 | 4/2002 | Wobben | |
| 2003/0066934 A1 | 4/2003 | Bolonkin | |

FOREIGN PATENT DOCUMENTS

| | | |
|---|---|---|
| DE | 31 12 122 C2 | 7/1982 |
| DE | 39 41 290 A1 | 6/1991 |
| DE | 41 05 809 | 9/1992 |
| DE | 296 09 242 | 8/1996 |
| DE | 195 34 404 | 3/1997 |
| DE | 195 45 008 A1 | 8/1997 |
| DE | 196 20 906 | 1/1998 |
| DE | 197 45 007 A1 | 4/1998 |
| DE | 197 31 918 | 1/1999 |
| DE | 198 52 229 A1 | 8/2000 |
| DE | 199 48 194 | 4/2001 |
| DE | 200 21 970 | 4/2001 |
| EP | 0 072 598 | 2/1983 |
| EP | 0 317 322 | 5/1989 |
| JP | 2000 096573 | 9/2000 |
| NL | A 9 201 787 | 5/1994 |
| WO | WO 81/03702 | 12/1981 |
| WO | WO 81 03702 | 12/1981 |
| WO | WO 90/07823 | 7/1990 |
| WO | WO 97 38292 | 10/1997 |
| WO | WO 99 36695 | 7/1999 |
| WO | WO 99 51305 | 10/1999 |

OTHER PUBLICATIONS

VDI Berichte Nr. 1515 (1999) (including English translation).

Flender ESAT, ESAT Application Reports.

"Wälzlagerdiagnostik für Maschinen und Anlagen" von Sturm, Förster, Hippmann, Kinsky; VEB Verlag Technik, Berlin 1985, Seiten 57, 58, 78 bis 80, 133 bis 137, 150 bis 153.

"Allianz-Handbuch der Schadenverhütung", VDI-Verlag, 1984, 3. Auflage; ISBN: 3-18-419089-7, Seiten 34, 35, 49.

"Studie Diagnosesysteme" von Dr. Ellmer, Heft 412 der FVA, Forschungsvorhaben Nr. 242, Drucklegung Dec. 14, 1993, Seiten 3, 5 und 7.

* cited by examiner

SYSTEM AND METHOD FOR MONITORING A WIND TURBINE

The invention relates to a system for monitoring wind turbines, wherein acoustic monitoring, in particular, is performed.

For efficient use of wind turbines, it is advantageous to design the control and operational management systems of wind turbine in such a way that fully automatic operation of the turbine is assured. Any other type of system requiring manual intervention during normal operation is unacceptable for financial reasons. In order to achieve a further increase in the efficiency of the wind turbine, the control system should function in such a way that energy conversion efficiency is maximised. Another important aspect regarding the control and management of a wind turbine is operational reliability. Technical malfunctions and hazardous states produced by environmental factors must be identified, and the safety circuits present must be activated. In addition, a control system can help to reduce the mechanical stresses exerted on the wind turbine.

When monitoring wind turbines, it is also desirable that analysis can be performed remotely. This has the advantage that the respective operational data can be captured at a central location. Such remote monitoring can lead to enhanced efficiency of the wind turbine and to an increase in the average availability of the wind turbine. For example, the operational data are polled and analysed by a service centre or by a remote monitoring station. Analysing the received parameters means, firstly, that any problems that arise can be detected at an early stage, and, secondly, that the operational data can supply important details for the development department with regard to power output and wind data. An analysis of said data by the development department can lead to improvements to the wind turbine.

In a known wind turbine, for example, the following parameters are usually monitored by sensors: wind speed, wind direction, air density, rotor speed in rpm (mean and extreme values), temperature, current levels, voltages, switching impulse, lightning hits (event counter), etc.

Analysis by the remote monitoring station of the parameters thus obtained can led to an improvement in on-site service, in that the remote monitoring station is able to give the on-site service personnel precise details regarding the sources of faults.

In order to further improve the maintenance, safety and efficiency of a wind turbine, it is desirable to monitor additional parameters of the wind turbine. The invention is therefore based on the technical problem of improving wind turbine monitoring.

The invention solves the technical problem by providing a system with the feature according to claim 1. Advantageous developments are described in the subclaims.

In one aspect, the advantages achieved with the invention consist, in particular, in the fact that improved early detection of faults can be carried out to prevent subsequent damage from occurring. This can lead, for example, to the detection of loose screw connections, of electrical faults in the generator, the inverter or the transformer, and of wear or ice formation on the blades at an early stage For acoustic monitoring of wind turbines, the invention provides for a reference noise spectrum of a wind turbine or parts thereof to be recorded and stored. The spectrum of operating noise can be recorded continuously or recurrently during operation and compared with the stored reference spectrum, and deviations between these two spectra can be detected. Instead of recording a reference noise spectrum of a wind turbine, use can be made of a previously stored reference noise spectrum of a wind turbine.

Pursuant to one advantageous embodiment of the invention, the detected deviations between the operating and the reference noise spectrum are transmitted to a remote monitoring station so that they can be analysed at a central location.

It is also advantageous to transmit to the remote monitoring station the original noises recorded by an acoustic pick-up and which cause the deviation between the operating and the reference spectrum, so that the operating personnel at the station can themselves check the noises by listening to them.

It is particularly advantageous in this regard to form a noise pattern from the original noises and subsequently to create an acoustic database with said noise patterns.

If the deviations between the operating and the reference spectrum are greater than a predefined threshold value, the wind turbine is switched off, if necessary.

An embodiment of the invention will now be described.

According to one aspect of one embodiment of the invention, a typical reference noise spectrum or reference noise profile of the wind turbine is recorded during trial operation of a wind turbine for certain types of operation, such as partial load or nominal load, and stored in a data storage device. In the case of identical wind turbines, it is also possible to use a previously stored reference noise spectrum rather than record a reference noise spectrum specific to each wind turbine. There are several locations in the wind turbine where acoustic pick-ups can be mounted in order to record the noise spectrum. For example, the blades, the generator and/or the drivetrain and the electronic systems can be monitored. For example, an acoustic pick-up is mounted outside on the tower to monitor the blades, in the nacelle to monitor the generator and the drivetrain, and in the foot of the tower or in the transformer substation to monitor the electronic systems. The mounting position of the acoustic pick-ups should not be altered between recording the reference noise spectrum and recording the spectrum of operating noise.

When the wind turbine is in operation, the respective noise (e.g. as a frequency spectrum from 0.1 Hz–30 KHz) is recorded in relation to the operating point or operative range, for example from 0 KW to the nominal power output. This operating noise is compared with the reference noise spectrum and evaluated.

When recording the spectrum of operating noise, the operative range of the wind turbine is determined first in order to compare the spectrum of operating noise in the respective range with the corresponding reference noise spectrum. If deviations occur that exceed a predetermined threshold value, an error message is generated and sent to the remote monitoring station, and, if necessary, the wind turbine is then switched off either manually (by the monitoring station) or automatically.

On detecting a deviation between the operating and the reference noise spectrum that exceeds the threshold value, as described in the foregoing, an error message is transmitted to a remote monitoring station. In the remote monitoring station, the error message or the deviation can be subjected to precise analysis. The operating personnel at the remote monitoring station can respond rapidly to an error message, if necessary, and transmit the error message to the maintenance personnel on site. In this way, any fault can be detected sufficiently early, and such faults can be quickly remedied by the maintenance personnel. In addition, subsequent damage can be avoided in this way. By thus improving the maintenance and repair of the wind turbine, the average availability of the wind turbine and hence the efficiency of the wind turbine can be enhanced.

In order to improve fault diagnosis, the original noise that caused the deviation between the operating and the reference spectrum, and which was recorded with an acoustic pick-up, can be transmitted to the remote monitoring station. There, the operating personnel can listen to the noises in question in a more differentiated manner and take the requisite action, if necessary. Such a procedure is desirable, because the human ear responds more sensitively and selectively to certain noises than signal processing equipment does.

In order to reduce the strains imposed on operating personnel in the remote monitoring station, noise patterns can be formed from the original noises (audio signals), and said patterns used to create an acoustic database. A signal processing unit compares the recorded noises from a wind turbine with the stored noise patterns and preselects potential causes of the fault. For example, the recorded audio signals can be digitalised and converted into noise patterns, then subjected to further digital processing. Thus, the operating personnel in the remote monitoring station can listen to the particular noise and already has potential causes of the fault at its disposal, as proposed by the signal processing unit. This method can lead to a reduction in stress and to an improvement in the workplaces of the operating personnel at the remote monitoring station, and make monitoring more effective.

By creating a database in which all deviations between the operating and the reference noise spectrum are successively stored, it is also possible to gain knowledge about the cause and the chronological development of a fault. Furthermore, the data in said database can be compared with data for other operating parameters, such as wind speed, temperature, current, voltage, etc. Comparing these data may possibly lead to a correlation in the development of faults being discovered. Such indicators would be very valuable for the development department, because this knowledge can be applied to the development of new wind turbines and in the improvement of existing wind turbines.

A camera (optical sensor) can be provided in the nacelle. This camera requires a mounting. Said mounting can, for example, be a telescopic arm that is suitably movable and/or pivotable. Of course, the camera can also be pivotably mounted to said telescopic arm, thus resulting in several degrees of freedom.

Alternatively, the camera can be displaceably mounted on a rail running in the axial direction of the nacelle. Here again, of course, the camera itself can be pivotably hinged to the rail.

One particularly advantageous solution is to dispose the camera on a circular or elliptical rail, or the guide rail for the camera runs in such a way that it is possible not only to capture front views of the equipment inside the nacelle, such as generators, but the camera can also be moved along a suitably designed guide rail and over a control cabinet, for example, and may thus even permit a view inside such a cabinet (e.g. with transparent cabinet walls).

In certain circumstances, of course, such a system may be quite complex. In contrast, a simple and less complex mounting for the camera may be provided at a central location inside the nacelle, with a fixed, predefined direction. Alternatively, the camera is mounted at said location but such that it is pivotable about one axis (e.g. the vertical axis). If the aperture angle of the lens is sufficiently wide, the camera will indeed permit a panoramic view around the nacelle—with the exception of an area outside the aperture angle on the floor and/or the roof of the nacelle. This limitation can be eliminated at least partially in the case of a fixed-location camera by providing a second degree of freedom (pivotable about a horizontal axis).

In a further variant of the invention, exchangeable lenses or optics for the camera can be provided. Depending on the specific use, zoom lenses can be deployed in the case of fixed-location mounting, so that (relatively) distant details can be filmed. A wide-angle lens enables an overview of the nacelle to be obtained. In addition, it is possible to use an infrared lens to film situations involving heat transmission.

In a simple embodiment, these optics or lenses can be replaced by maintenance personnel on site, for example when a service centre would like to have certain optical/thermal information. In a particularly convenient embodiment, this lens replacement can be effected by remote control from a remote control station.

Depending on local circumstances and/or the specific technical details of the wind turbine, it is also possible, of course, to provide several cameras. One camera can be mounted inside the nacelle, for example. This camera can then film that part of the ring generator facing it, but not, of course, that part of the generator facing away from it (on the rotor hub side), or details in the rotor hub itself, the blade mounts, etc. To do this, an additional camera is provided close to the rotor hub.

In another embodiment, another camera can be provided in the foot of the tower, or near the transformer, in order to acquire a visual impression of that area as well. This visualization option can go so far as to include specific optical displays that may be intended for maintenance personnel, or counter statuses displayed in the wind turbine independently of any remote monitoring of the wind turbine Of course, light is needed to capture a picture, if said picture is to be taken within the range of visible light. Said light can come, firstly, from light sources that are provided anyway to illuminate the wind turbine, e.g. during maintenance work. On the other hand, the light can also or additionally come from separate light sources that improve the lighting conditions. However, illumination of the nacelle interior can also be achieved by providing part of the nacelle with a transparent housing, so that natural light can fall inside the nacelle and light the nacelle during the day.

This/these light source(s) can be mounted separately from the camera and be switched on and off, or moved, simultaneously with the camera. Alternatively, this/these light source(s) can also be mechanically coupled with the camera and, by being aimed in the direction viewed by the camera, can illuminate the area in front of the camera at all times.

As another alternative, light source(s) and/or camera(s) can be remotely controlled either separately or jointly, or controlled by an automatic system. For example, if a noise occurs that can be readily identified and indicates a certain event, camera(s) and/or light source(s) can be switched on and moved to predetermined positions once the noise has been registered. This can obviate the need to look for the source of the noise or fault, and the camera(s) and light source(s) can be focused on the latter in the fastest way possible.

Focusing can be based, on the one hand, on specified coordinate data that are generated either as absolute values or as values relative to the current camera position. On the other hand, focusing can be performed in such a way that, when the position of the fault has been detected, said position is marked by a light source and the camera automatically focuses on it, and additional light source(s) are activated if needed.

By this means—analogously, for example, to the display of faults in electronic components in complex equipment, which can be done with an active LED on the component—a light source on the faulty component of the wind turbine can be switched on when a fault occurs. The camera can be focused on that position on the basis of different brightnesses, particularly when the rest of the wind turbines is in darkness.

Another way of focusing the camera or spotlight is by using unidirectional microphone(s) that are either mounted at reference positions and aimed in predefined directions, or coupled to the camera to induce a swivelling movement of the camera until the detected noise level reaches a maximum. If the aperture angle of the unidirectional microphone is sufficiently small, the camera is then focused on the source of the noise.

When unidirectional microphones are mounted at reference positions, the different signals from the various microphones must be gathered and analysed. Like taking a bearing, the direction of the noise source can then be determined.

Accordingly, therefore, the detected noise event can trigger an automatic control system that automatically guides the camera(s) and the light source(s) to the (hopefully) correct position. An automatic audiovisual recording and/or transmission, e.g. to a monitoring station, can also be performed, of course.

However, the noise event detected can also be used solely to send a signal to the monitoring station so that the occurrence of a fault is displayed there. The camera is then controlled from the monitoring station, and all the control steps performed in the foregoing by an automatic system can also be carried out, of course, by manual remote control from the monitoring station.

As a source of orientation in the case of manual control, one can use acoustic data (from a unidirectional microphone), optical data (from a camera) or combinations thereof, or other data. When there is a clearly indicated noise event, this can also be transmitted to the monitoring station and analysed there.

If such analysis is conducted on the basis, for example, of an existing stock of reference data, the operator can then be shown the required position for the camera and/or the light source(s). The operator can then control the camera(s) and light source(s) on the basis of this information. Of course, the operator can also control the camera(s) and light source(s) online using visual and/or acoustic data transmitted (in real-time).

The idea of placing pictures on the Internet, e.g. for the operator of the wind turbine, is another variant of the invention. Prioritisation of the data to be transmitted could play a role here, for example by always giving priority to operational data and/or remote control data over such visual and/or audio data.

One arrangement of the monitoring equipment in the nacelle area can lead, as a result of changing wind direction, to the camera pointing in a random direction, with the prevailing wind direction forming a preferred direction, of course. However, the camera can also be mounted, on the one hand, in a direction that deviates from this prevailing wind direction, and thus change accordingly the direction in which it points when the azimuth position of the nacelle changes.

On the other hand, however, the camera can also be designed to be pivotable (with the nacelle), to that an observer can change the direction of view. Such a camera—installed on one of the wind turbines in a wind farm, for example—permits a scan over the entire wind farm, firstly, and, secondly, over the surrounding landscape when the weather is good and visibility is clear.

If one now combines such a camera with a device for measuring visual range, the camera position can, for example, be superimposed on a map. In addition, the current viewing direction of the camera and the visual range can also be shown on the map, and the current picture from the camera can be shown in a window.

These possibilities give rise to very attractive Internet content that can communicate not only a purely optical stimulus but also educational content. Thus, the invention also provides a means by which, when a distance is laid off on a map in a particular direction, a visual, in natura impression of it can be obtained.

Other applications could include, for example, fire monitoring or other forms of control such as monitoring the volume of traffic on a motorway or the like. If the position of the camera can be changed in respect of its height on the tower, variable heights would give rise to further possible applications.

In summary, therefore, the camera constituting the optical sensor can be moved or pivoted inside the nacelle of a wind turbine (i.e. that part of the wind turbine in which the generator is normally housed) in such a way that the respective location being filmed is spotlit or illuminated.

If temperature increases, in particular, are to be detected, the optical sensor can be configured as an infrared sensor as well (i.e. as an infrared camera), so that thermally critical parts of the wind turbine can be monitored without illumination.

Of course, the camera itself can also house the acoustic pick-up, i.e. the microphone, so that a compact unit is then created with which the wind turbine and/or its interior can be monitored.

It is also possible to accommodate the camera in the foot of the tower in order to monitor parts of the wind turbine that are located there, such as inverters or transformers.

The lighting means associated with the respective optical sensor can either be switched on permanently, or preferably be switched on by remote control whenever pictures are taken with the optical sensor. All pictures taken by the optical sensor can also be sent with suitable equipment, such as a modem, to a central station where several wind turbines are centrally monitored.

If the lighting means—and also a microphone, as described above—is mounted on the camera itself, the lighting means can always be pivoted/moved in conjunction with the camera, thus ensuring sufficient lighting of the location being filmed.

If necessary, however, the lighting means can also be separately pivotable.

If the acoustic pick-up described in the foregoing is a unidirectional microphone, the main direction from which noise emanates can be determined with such a device. If this is done by means of a control device, a control signal for the optical sensor can be generated by said control device so that the optical sensor is aimed at the main location where noise is being produced.

Another option is to fit the optical sensor as a "webcam", so that the wind turbine operator (or other Internet user) can view his own turbine and/or its interior at all times, and know at all times whether the turbine is still working.

If another optical sensor is positioned on the nacelle or on the tower, it is also possible to monitor the area around the wind turbine, which can be very advantageous for traffic monitoring, for example, or for fire monitoring (when infrared cameras, in particular, are to be recommended).

FIG. 1 basically shows the cross-section through a nacelle of a wind turbine, with a nacelle housing 1, a rotor 2, a generator 3 coupled with the rotor, and a tower 4 of the wind turbine. Two cameras 5 and 6 are accommodated as optical sensors inside the nacelle, said cameras, in one embodiment, being mainly directed at the generator. The cameras are movable along a rail, but also pivotable, and other views of nacelle can be recorded with the cameras, particularly parts of the rotor and the rotor hub. The cameras shown in FIG. 1 are also able to optically monitor the generator, in particular, in other words whether its fixed and movable parts are working properly.

Of course, the cameras can also include microphones for sound recording, or the microphones can be positioned at positions similar to those of the cameras, so that the sound inside the nacelle can be recorded.

Figure 2:
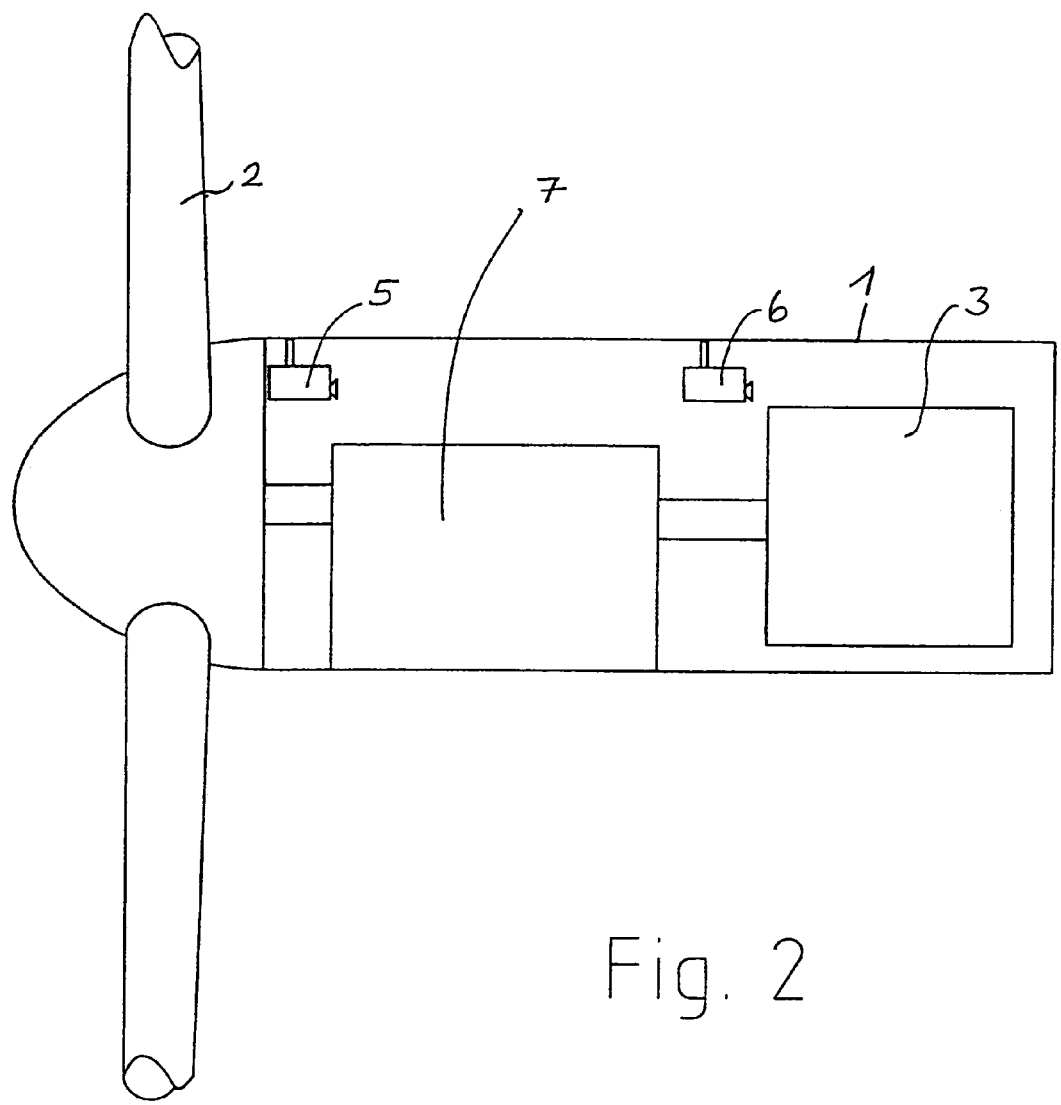

FIG. 2 shows a different structure of a wind turbine nacelle, in which rotor 2 is coupled with generator 3 via a gearbox 7. By means of the cameras 5 or 6 mounted in the nacelle, it is therefore possible to perform optical monitoring not only of the generator but also of the gearbox.

If a microphone pick-up (or several) is (are) mounted in the nacelle, it is also possible to perform acoustic monitoring of the aforementioned parts of the wind turbine, in particular acoustic monitoring of the gearbox and the generator.

What is claimed is:

1. A wind turbine comprising:
a tower;
a nacelle housing coupled to the tower;
a rotor coupled to the nacelle housing;
a generator coupled to the rotor;
a first acoustic sensor to detect a sound produced in a first location of the wind turbine; and
a first optical sensor, disposed within the nacelle housing, to image the first location of the wind turbine after the first acoustic sensor detects the sound produced in the first location.

2. The wind turbine of claim 1 further including a rail disposed in the nacelle housing, wherein the first optical sensor is coupled to the rail and wherein the first optical sensor is adapted to move along the rail within the nacelle housing.

3. The wind turbine of claim 2 wherein the rail is formed in a closed ring within the nacelle housing.

4. The wind turbine of claim 1 further includes a second optical sensor disposed on or in the wind turbine to image a portion of the wind turbine.

5. The wind turbine of claim 4 wherein the first optical sensor is located within the nacelle housing to image at least a portion of the generator of the wind turbine.

6. The wind turbine of claim 4 further including a gear box and wherein the second optical sensor images at least a portion of the gear box of the wind turbine.

7. The wind turbine of claim 4 wherein the second optical sensor is an infrared sensor.

8. The wind turbine of claim 1 wherein the first optical sensor is an infrared sensor.

9. The wind turbine of claim 1 further including lighting means, disposed within the nacelle housing, to provide illumination within the nacelle housing while the first optical sensor images the first location of the wind turbine.

10. The wind turbine of claim 1 wherein the first optical sensor is pivotably mounted within the nacelle housing.

11. The wind turbine of claim 1 further including a rail disposed in the nacelle housing, wherein the first optical sensor is pivotably coupled to the rail.

12. The wind turbine of claim 1 wherein the first optical sensor is responsive to control signals from a remote control station.

13. A wind turbine comprising:
a tower;
a nacelle housing coupled to the tower;
a rotor coupled to the nacelle housing;
a first acoustic sensor, disposed within the nacelle housing, to detect a sound emanating from a location within the nacelle housing of the wind turbine; and
a first optical sensor, disposed within the nacelle housing, to image the location within the nacelle housing of the wind turbine in response to the first acoustic sensor detecting the sound.

14. The wind turbine of claim 13 further including a rail disposed within the nacelle housing, wherein the first optical sensor is pivotably coupled to the rail.

15. The wind turbine of claim 14 wherein the rail is formed in a closed ring within the nacelle housing.

16. The wind turbine of claim 13 wherein the first optical sensor is an infrared sensor.

17. The wind turbine of claim 13 further includes a second optical sensor, disposed within the nacelle housing, to image a portion of the wind turbine.

18. The wind turbine of claim 17 further including:
a generator;
a gearbox; and
wherein the first optical sensor is positioned to image at least a portion of the generator of the wind turbine and the second optical sensor is positioned to image at least a portion of the gearbox of the wind turbine.

19. The wind turbine of claim 17 wherein the first optical sensor or the second optical sensor is an infrared sensor.

20. The wind turbine of claim 13 further including lighting means, disposed within the within the nacelle housing, to provide illumination within the nacelle housing while the first optical sensor images the location within the nacelle housing of the wind turbine.

21. The wind turbine of claim 13 wherein the first optical sensor is pivotably mounted within the nacelle housing.

22. The wind turbine of claim 13 wherein the first acoustic sensor is a unidirectional microphone.

23. The wind turbine of claim 13 wherein the first optical sensor is responsive to control signals from a remote control station.

24. The wind turbine of claim 13 wherein the nacelle housing includes a material that allows natural light to enter the nacelle housing.

25. A method of monitoring a wind turbine having a plurality of components including: (i) a tower, (ii) a nacelle housing coupled to the tower, (iii) a rotor, coupled to the nacelle housing, (4) a first acoustic sensor, and (5) a first optical sensor, the method comprising:
detecting an operating acoustic spectrum generated by at least one of the components during operation of the wind turbine;
comparing the operating acoustic spectrum to a reference acoustic spectrum;
detecting a deviation between the operating acoustic spectrum and the reference acoustic spectrum;
determining whether the deviation between the operating acoustic spectrum and the reference acoustic spectrum exceeds a threshold; and
imaging at least a portion of the component that generated the operating acoustic spectrum when the deviation between the operating acoustic spectrum and the reference acoustic spectrum exceeds the threshold.

26. The method of claim 25 wherein the reference acoustic spectrum is an acoustic spectrum produced by the component during normal operation.

27. The method of claim 25 wherein the reference acoustic spectrum is an acoustic spectrum that is expected to be generated by the component during normal operation.

28. The method of claim 9 wherein when the deviation between the operating acoustic spectrum and the reference acoustic spectrum exceeds the threshold, the operation of the wind power installation is automatically or manually terminated.

29. The method of claim 25 further including:
repetitively detecting the operating acoustic spectrum generated by the component of the wind power installation;
repetitively comparing the detected operating acoustic spectrums to a reference acoustic spectrum; and
determining whether the comparison between the detected operating acoustic spectrums to a reference acoustic spectrum exceeds a threshold.

30. The method of claim 25 further including:
continuously detecting the operating acoustic spectrum generated by the component of the wind power installation;
comparing the detected operating acoustic spectrums to a reference acoustic spectrum; and
determining whether the comparison between the detected operating acoustic spectrums to a reference acoustic spectrum exceeds a threshold.

* * * * *

UNITED STATES PATENT AND TRADEMARK OFFICE
CERTIFICATE OF CORRECTION

PATENT NO. : 6,966,754 B2
DATED : November 22, 2005
INVENTOR(S) : Wobben

It is certified that error appears in the above-identified patent and that said Letters Patent is hereby corrected as shown below:

Column 8,
Line 35, delete the first occurrence of "within the".
Line 52, replace "(4)" with -- (iv) --; and replace "(5)" with -- (v) --.

Column 9,
Line 7, replace "9" with -- 25 --.

Signed and Sealed this

Seventh Day of March, 2006

JON W. DUDAS
*Director of the United States Patent and Trademark Office*